(12) United States Patent
Maeda et al.

(10) Patent No.: US 9,793,554 B2
(45) Date of Patent: Oct. 17, 2017

(54) FUEL CELL SEPARATOR AND FUEL CELL

(75) Inventors: Kuroudo Maeda, Miyoshi (JP);
Naotaka Aoyama, Toyoake (JP);
Masahiro Mizuno, Kariya (JP)

(73) Assignees: Toyota Jidosha Kabushiki Kaisha,
Toyota-shi, Aichi-ken (JP); Aisin Takaoka Co., Ltd., Toyota-shi, Aichi-ken (JP)

( * ) Notice: Subject to any disclaimer, the term of this patent is extended or adjusted under 35 U.S.C. 154(b) by 341 days.

(21) Appl. No.: 13/003,596

(22) PCT Filed: Jun. 30, 2009

(86) PCT No.: PCT/JP2009/062398
§ 371 (c)(1),
(2), (4) Date: Mar. 22, 2011

(87) PCT Pub. No.: WO2010/007918
PCT Pub. Date: Jan. 21, 2010

(65) Prior Publication Data
US 2011/0165501 A1    Jul. 7, 2011

(30) Foreign Application Priority Data

Jul. 16, 2008  (JP) ................................. 2008-184595

(51) Int. Cl.
*H01M 8/04* (2016.01)
*H01M 8/0206* (2016.01)
(Continued)

(52) U.S. Cl.
CPC ....... *H01M 8/0206* (2013.01); *H01M 8/0228* (2013.01); *H01M 2008/1095* (2013.01)

(58) Field of Classification Search
CPC .... Y02E 60/50; Y02E 60/525; H01M 8/0228; H01M 8/0206; H01M 8/0232;
(Continued)

(56) References Cited

U.S. PATENT DOCUMENTS

2002/0192527 A1* 12/2002 Seido et al. .................... 429/34
2004/0197661 A1   10/2004 Utsunomiya et al.
(Continued)

FOREIGN PATENT DOCUMENTS

JP    2004-296381    10/2004
JP    2006-97088     4/2006
(Continued)

OTHER PUBLICATIONS

International Preliminary Report on Patentability (second) in International Application No. PCT/JP2009/062398; Mailing Date: Jan. 25, 2011.
International Search Report in International Application No. PCT/JP2009/062398; Mailing Date: Sep. 16, 2009.
Written Opinion of the International Searching Authority in International Application No. PCT/JP2009/062398; Mailing Date: Sep. 16, 2009.
(Continued)

*Primary Examiner* — Mark F Huff
*Assistant Examiner* — Monique Wills
(74) *Attorney, Agent, or Firm* — Finnegan, Henderson, Farabow, Garrett & Dunner, LLP

(57) ABSTRACT

A fuel cell separator in which the adhesion of a conductive coating formed on the surface of the fuel cell separator is further improved. The fuel cell separator (20) includes a metal substrate (24) molded from titanium, and a conductive coating (30) that exhibits conductivity and is formed on the surface of the metal substrate (24), wherein the conductive coating (30) contains conductive particles, and the average particle size of the conductive particles is not less than 1 nm and not more than 100 nm. The average particle size of the conductive particles is preferably not less than 1 nm and not more than 10 nm, and more preferably not less than 1 nm and not more than 5 nm.

9 Claims, 10 Drawing Sheets

(51) Int. Cl.
*H01M 8/0228* (2016.01)
*H01M 8/1018* (2016.01)

(58) Field of Classification Search
CPC ...... H01M 8/021; H01M 4/921; H01M 4/923; H01M 12/06
See application file for complete search history.

(56) References Cited

U.S. PATENT DOCUMENTS

| | | |
|---|---|---|
| 2005/0130013 A1 | 6/2005 | Utsunomiya et al. |
| 2007/0298309 A1 | 12/2007 | Vyas et al. |
| 2009/0092874 A1* | 4/2009 | Abd Elhamid et al. ........ 429/30 |
| 2009/0226785 A1* | 9/2009 | Kihira et al. .................. 429/30 |
| 2010/0119882 A1* | 5/2010 | Suzuki et al. .................. 429/12 |

FOREIGN PATENT DOCUMENTS

| | | | | |
|---|---|---|---|---|
| JP | WO2006/137584 | * | 12/2006 | ............ H01M 8/10 |
| JP | WO 2007/013508 | * | 1/2007 | ............ H01M 4/86 |
| JP | 2008-78122 | | 4/2008 | |
| JP | 2008-106355 | | 5/2008 | |
| JP | 2008-159420 | | 7/2008 | |

OTHER PUBLICATIONS

Applicant's Reply in International Application No. PCT/JP2009/062398, responding to Written Opinion mailed Sep. 16, 2009.
International Preliminary Report on Patentability in International Application No. PCT/JP2009/062398; Completion Date: Nov. 3, 2010.

* cited by examiner

FINE Au PLATING ON Ti (CROSS-SECTION)

RELATIONSHIP BETWEEN Au PARTICLE SIZE AND ADHESION
(CROSS-CUT TEST)

RELATIONSHIP BETWEEN PARTICLE SIZE
AND CONTACT RESISTANCE

RELATIONSHIP BETWEEN AU PARTICLE SIZE AND COST

FUEL CELL SEPARATOR AND FUEL CELL

TECHNICAL FIELD

The present invention relates to a fuel cell separator and a fuel cell, and relates more particularly to a fuel cell separator manufactured using a metal material and a fuel cell equipped with such a fuel cell separator.

BACKGROUND ART

Fuel cells have been attracting considerable attention in recent years as examples of electrical cells that offer superior environmental friendliness and a high level of efficiency. In a fuel cell, generally, an oxidizing gas such as the oxygen within air is subjected to an electrochemical reaction with a fuel gas such as hydrogen, thereby generating electrical energy. Water is generated as a result of the electrochemical reaction between the hydrogen and oxygen.

Different types of fuel cells include phosphoric acid fuel cells, molten carbonate fuel cells, solid electrolyte fuel cells, alkali fuel cells, and solid polymer fuel cells. Of these, solid polymer fuel cells, which offer certain advantages such as ambient temperature startup and a rapid startup time, are attracting particular attention. This type of solid polymer fuel cell can be used as the power source for a moving object such as a vehicle.

A solid polymer fuel cell is assembled by laminating together a plurality of unit cells, a current collector and an end plate and the like. Each unit cell for the fuel cell comprises an electrolyte membrane, a catalyst layer, a gas diffusion layer and a separator. The fuel cell separator is manufactured by machining a metal material or carbon material or the like.

Patent Document 1 discloses a gold-plated structure having gold-plated sections and non-plated sections on the surface of a titanium substrate, wherein the gold-plated sections are scattered across the surface of the titanium substrate in the form of islands having a diameter of not more than 100 nm but not less than 1 nm, and also discloses a fuel cell separator formed from this gold-plated structure.

Patent Document 2 discloses a fuel cell separator in which the surface of a stainless steel sheet that has undergone no surface preparation treatment is coated with gold at a surface area ratio of 2.3 to 94%.

CITATION LIST

Patent Literature

Patent Document 1: JP 2006-97088 A
Patent Document 2: JP 2004-296381 A

SUMMARY OF THE INVENTION

Technical Problems

However, when a fuel cell separator is manufactured using a metal material such as titanium, a conductor having a high electrical conductivity such as gold (Au) or the like is usually formed on the surface of the separator so that, for example, the contact resistance with the gas diffusion layer can be reduced. However, because metal materials such as titanium and conductors such as gold (Au) are very different materials, the adhesion of the conductive coating formed using the conductor is often unsatisfactory.

Accordingly, it is an advantage of the present invention to provide a fuel cell separator in which the adhesion of a conductive coating formed on the surface of the fuel cell separator can be further improved.

Solution to Problems

A fuel cell separator according to the present invention comprises a metal substrate molded from titanium, and a conductive coating that exhibits conductivity and is formed on the surface of the metal substrate, wherein the conductive coating comprises conductive particles, and the average particle size of the conductive particles is not less than 1 nm and not more than 100 nm.

Further, the average particle size of the conductive particles is preferably not less than 1 nm and not more than 10 nm.

Furthermore, the average particle size of the conductive particles is preferably not less than 1 nm and not more than 5 nm.

Furthermore, the conductive particles are preferably gold particles.

Moreover, the fuel cell separator preferably includes an oxide layer between the metal substrate and the conductive coating.

Furthermore, the oxide layer is preferably a titanium oxide layer.

A fuel cell according to the present invention is equipped with the fuel cell separator described above.

Advantageous Effects of the Invention

As described above, according to the fuel cell separator of the present invention, by controlling the particle size of the conductor, the adhesion of the conductive coating formed on the surface can be further improved.

DESCRIPTION OF EMBODIMENTS

Figure 1:
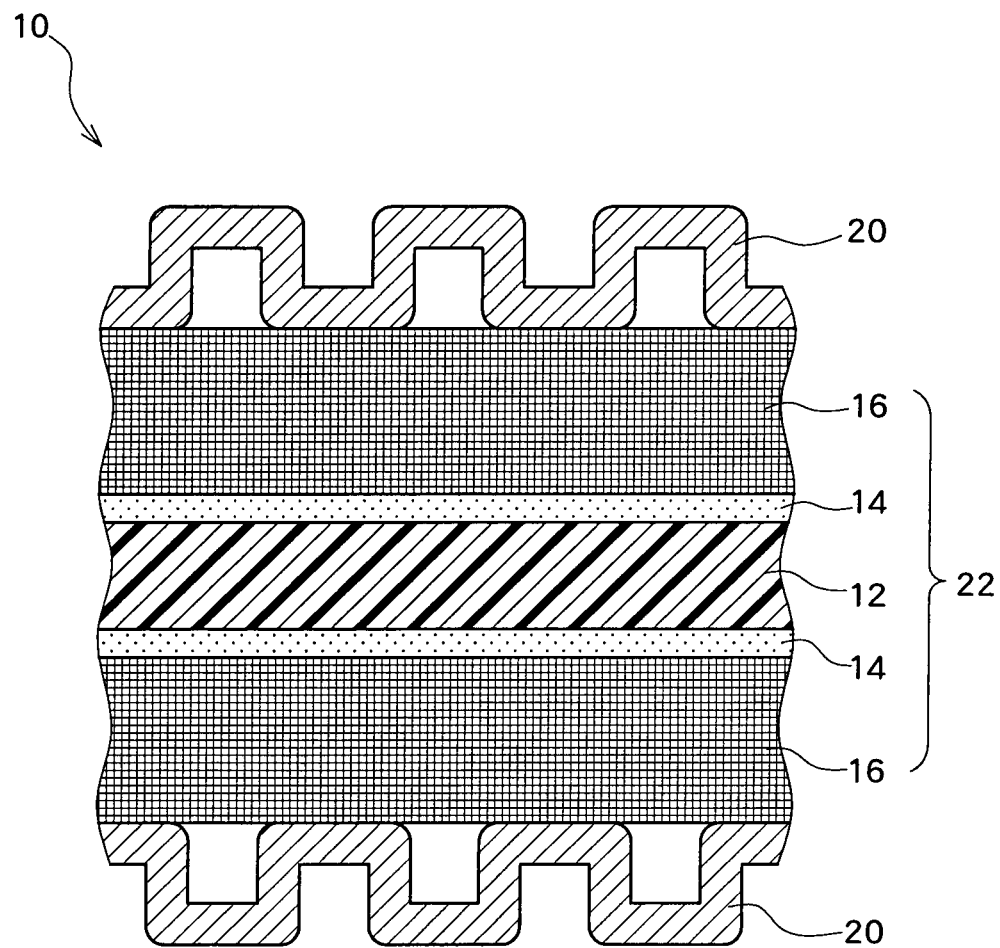
FIG. 1 is a diagram illustrating a cross-section of a unit cell of a fuel cell according to an embodiment of the present invention.

A detailed description of embodiments of the present invention is presented below with reference to the drawings. FIG. 1 is a diagram illustrating a cross-section of a unit cell 10 of a fuel cell according to an embodiment of the present invention. The unit cell 10 of the fuel cell comprises an electrolyte membrane 12, catalyst layers 14, gas diffusion layers 16, and separators 20. Of these, an integrated assembly of the electrolyte membrane 12, the catalyst layers 14 and the gas diffusion layers 16 is generally known as a membrane electrode assembly (MEA) 22.

The electrolyte membrane 12 has a function of transporting hydrogen ions generated at the anode electrode side to the cathode electrode side. A chemically stable fluororesin such as a perfluorocarbonsulfonic acid ion exchange membrane or the like may be used as the material for the electrolyte membrane 12.

The catalyst layers 14 have a function of accelerating the oxidation reaction of hydrogen at the anode electrode, and the reduction reaction of oxygen at the cathode electrode. Each catalyst layer 14 comprises a catalyst and a catalyst support. In order to maximize the electrode surface area available for reaction, the catalyst is generally in a particulate form that is adhered to the catalyst support. For the oxidation reaction of hydrogen and the reduction reaction of oxygen, a platinum group element having a small activation overpotential, such as platinum or the like, may be used as the catalyst. A carbon material such as carbon black or the like may be used as the catalyst support.

The gas diffusion layers 16 have a function of diffusing the fuel gas such as hydrogen gas and the oxidizing gas such as air through to the respective catalyst layer 14, as well as a function of transporting electrons. A material that exhibits conductivity, such as a carbon fiber woven fabric or a carbon paper or the like, may be used for the gas diffusion layers 16. The membrane electrode assembly 22 can be manufactured by laminating the electrolyte membrane 12, the catalyst layers 14 and the gas diffusion layers 16, and then performing heat pressing or the like.

The separators 20 are laminated to the gas diffusion layers 16 of the membrane electrode assembly 22, and have the function of isolating the fuel gas and the oxidizing gas in adjacent unit cells (not shown in the figure). Furthermore, the separators 20 also have the function of electrically connecting adjacent cells (not shown in the figure). Gas passages through which the fuel gas or oxidizing gas flow, and a coolant medium passage through which a coolant medium such as an LLC (long Life Coolant) or cooling water used for cooling the unit cell 10 flows, are formed in the separators 20.

Figure 2:
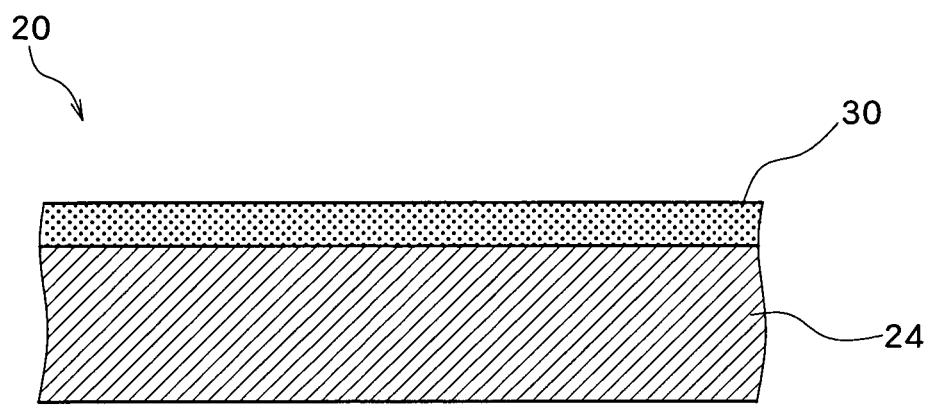
FIG. 2 is a diagram illustrating a cross-section of a fuel cell separator according to an embodiment of the present invention.

FIG. 2 is a diagram illustrating a cross-section of the fuel cell separator 20. The separator 20 comprises a metal substrate 24 and a conductive coating 30.

The metal substrate 24 is preferably molded from titanium (Ti). Titanium has a high degree of mechanical strength, and because an inactive film such as a passivation film formed from a stable oxide (such as TiO, $TiO_2$, or $Ti_2O_3$ or the like) is formed on the surface of the titanium, it also exhibits excellent corrosion resistance. Here, the term "titanium" includes not only pure titanium, but also titanium alloys. Of course, depending on other conditions, the material for the metal substrate 24 is not necessarily restricted to titanium, and other metal materials such as stainless steel (SUS) may also be used. Stainless steel comprises nickel (Ni) and chromium (Cr) and the like, and there is a possibility that these other elements may be eluted from the steel, although an inactive film such as a passivation film formed from a stable oxide (such as $CrO_2$, CrO, or $Cr_2O_3$ or the like) is formed on the surface of the stainless steel, and it therefore exhibits excellent corrosion resistance. The metal substrate 24 is molded, for example, by molding a titanium sheet or the like into an uneven pattern in order to form the gas passages or cooling water passages. The shape of the metal substrate 24 is, of course, not limited to this type of uneven shape.

The conductive coating 30 exhibits conductivity, and is coated onto the surface of the metal substrate 24. By coating the metal substrate surface that contacts the gas diffusion layer 16, the conductive coating 30 is able to reduce the contact resistance between the gas diffusion layer 16 and the separator 20.

The conductive coating 30 is preferably formed from conductive particles of gold (Au), silver (Ag), copper (Cu), platinum (Pt), rhodium (Rh) or iridium (Ir) or the like. These metals have a high level of electrical conductivity, and are therefore able to further reduce the contact resistance. Of these metal materials, gold (Au) offers excellent corrosion resistance as well as superior electrical conductivity, and is therefore particularly preferred as the metal material for forming the conductive coating 30. Further, the conductive coating 30 may also be formed using conductive particles of an alloy of gold (Au) and platinum (Pt) or the like.

The average particle size of the conductive particles is preferably not less than 1 nm and not more than 100 nm. The reason for specifying an average particle size for the conductive particles of not less than 1 nm is because if the particle size is smaller than 1 nm, then formation of the conductive particles is difficult, and the manufacturing costs for the separator 20 tend to increase. The reason for specifying an average particle size for the conductive particles of not more than 100 nm is because if the particle size is greater than 100 nm, then factors such as a decrease in the contact surface area between the conductive particles and the metal substrate 24 tend to cause a deterioration in the adhesion between the conductive coating 30 and the metal substrate 24. Moreover, if the particle size is greater than 100 nm, then the amount used of the gold (Au) or the like increases significantly, causing an increase in the manufacturing cost for the separator 20.

The average particle size of the conductive particles is more preferably not less than 1 nm and not more than 10 nm, and is still more preferably not less than 1 nm and not more than 5 nm. If the average particle size of the conductive particles is not more than 10 nm, then factors such as an increase in the contact surface area between the conductive particles and the metal substrate 24 tend to yield further improvement in the adhesion between the conductive coating 30 and the metal substrate 24, and if the average particle size of the conductive particles is not more than 5 nm, the adhesion between the conductive coating 30 and the metal substrate 24 is improved still further. Furthermore, if the average particle size of the conductive particles is not more than 10 nm, then the metal substrate surface can be coated more densely, resulting in an increase in the coating rate for the metal substrate surface (the ratio of surface area containing adhered conductive particles per unit surface area of the metal surface).

In this description, the "particle size" of a conductive particle can be taken as the maximum diameter across the particle. Of course, the particle size of a conductive particle may also be taken as the average diameter of the particle. The particle size of each conductive particle can be measured, for example, using a transmission electron microscope (TEM) or a scanning electron microscope (SEM) or the like. Of course, the method used for measuring the particle size is not limited to the above methods, and other methods may also be used.

Figure 3:
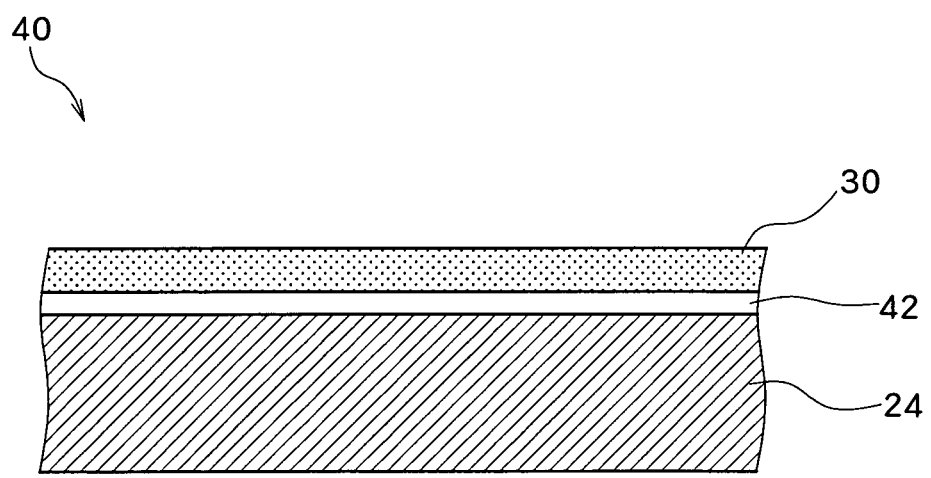
FIG. 3 is a diagram illustrating a fuel cell separator according to an embodiment of the present invention, in which an oxide layer is provided between the metal substrate and the conductive coating.
Figure 4:
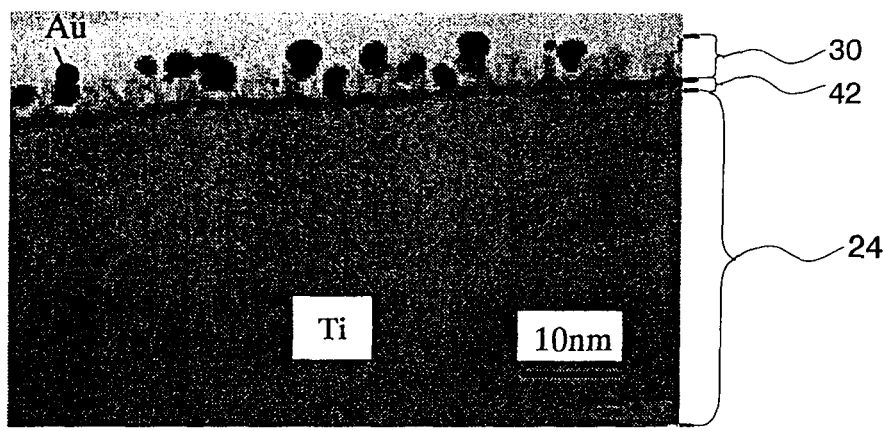
FIG. 4 is a TEM photograph of a cross-section of a fuel cell separator according to an embodiment of the present invention, in which a titanium oxide layer is provided between a metal substrate molded from pure titanium and a gold (Au) coating.

An oxide layer 42 is preferably provided between the metal substrate 24 molded from titanium and the conductive coating 30. FIG. 3 is a diagram illustrating a fuel cell separator 40 in which an oxide layer 42 is provided between the metal substrate 24 and the conductive coating 30. By forming the oxide layer 42 between the metal substrate 24 and the conductive coating 30, the adhesion between the metal substrate 24 and the conductive coating 30 can be further improved. The oxide layer 42 is preferably formed from an oxide of titanium (such as TiO, $TiO_2$, or $Ti_2O_3$ or the like). FIG. 4 is a TEM photograph illustrating a cross-section of the fuel cell separator 40 in which the titanium oxide layer 42 is provided between the metal substrate 24 molded from pure titanium and the gold (Au) coating 30. By employing the titanium oxide (such as TiO, $TiO_2$, or $Ti_2O_3$ or the like) generated by oxidation of the surface of the metal substrate 24 as the oxide layer 42, the adhesion between the metal substrate 24 and the oxide layer 42 can be improved. Furthermore, the thickness of the titanium oxide layer 42 is preferably within a range from 5 nm to 200 nm.

Next is a description of a method of manufacturing the fuel cell separator 20.

Figure 5:
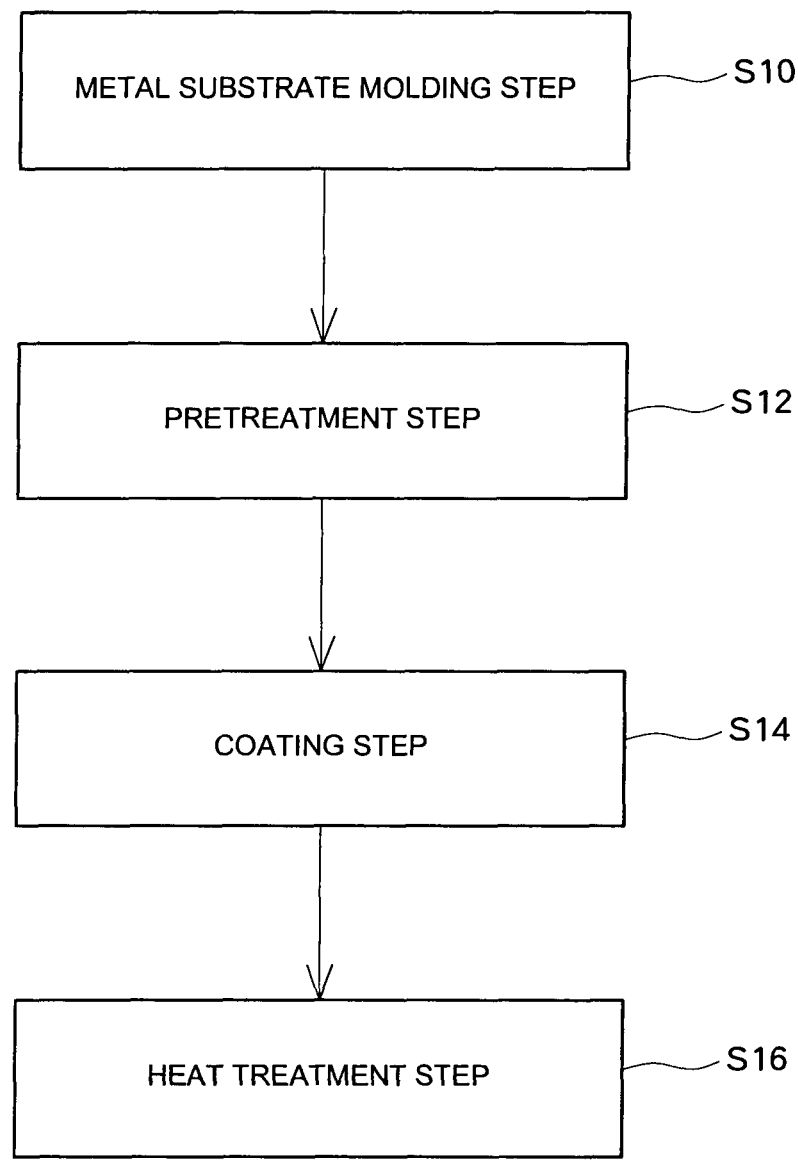
FIG. 5 is a flowchart illustrating a method of manufacturing a fuel cell separator according to an embodiment of the present invention.

FIG. 5 is a flowchart illustrating a method of manufacturing the fuel cell separator 20. The method of manufacturing the fuel cell separator 20 comprises a metal substrate molding step (S10), a pretreatment step (S12), a coating step (S14), and a heat treatment step (S16).

The metal substrate molding step (S10) is a step of molding the metal substrate 24 from a metal material such as titanium. The molding of the metal substrate 24 can be conducted using a typical machining process such as a cutting process or a plastic forming process such as press molding. The molding of the metal substrate 24 is, of course, not limited to the above processes.

The pretreatment step (S12) is a step of pretreating the metal substrate 24 molded from titanium or the like by performing a degreasing treatment and/or an acid washing treatment. By degreasing the metal substrate 24, any oil or the like adhered to the surface of the metal substrate can be removed. The degreasing treatment can be conducted via an alkali degreasing or alkali electrolytic degreasing or the like. Following degreasing, the metal substrate 24 is subjected to an acid washing treatment to remove the oxides and the like adhered to the metal substrate surface. The acid washing treatment may be conducted, for example, by dipping the metal substrate 24 in a nitric hydrofluoric acid solution prepared by mixing nitric acid and hydrofluoric acid. In those cases where an oxide layer 42 composed of a predetermined thickness of titanium oxide or the like is to be provided on the surface of the metal substrate, the length of the acid washing treatment may be shortened appropriately to leave an oxide layer on the substrate. Of course, the degreasing treatment and acid washing treatment for the metal substrate 24 are not restricted to the treatment methods outlined above, and other treatment methods may also be used.

The coating step (S14) is a step of coating a conductive coating 30 of gold (Au) or the like onto the pretreated metal substrate 24. The process of coating the gold (Au) particles or the like can be achieved via an electroplating method or the like. The electroplating method typically employs gold (Au), silver (Ag) or copper (Cu) electroplating. For example, in those cases where a coating of gold (Au) is applied as the conductive coating 30 to the metal substrate surface, a gold plating solution comprising gold potassium cyanide or the like may be used, whereas in those cases where a coating of silver (Ag) is applied to the metal substrate surface, a silver plating solution comprising silver cyanide or the like may be used. Furthermore, the particle size of the conductive particles such as gold (Au) particles that form the conductive coating 30 may be altered by appropriate adjustment of factors such as the current density, the plating treatment time, and the presence of additives such as tin (Sn), tantalum (Ta), nickel (Ni) and cobalt (Co) based materials.

Furthermore, the coating technique used for forming the conductive coating 30 is not limited to the electroplating method mentioned above, and other coating techniques such as physical vapor deposition (PVD) methods, chemical vapor deposition (CVD) methods, physical coating methods and inkjet methods may also be used. In a physical vapor deposition (PVD) method, a sputtering technique or ion plating technique or the like can be used for performing coating of the gold (Au) or the like. In a physical application method, particles of the gold (Au) or the like can be dispersed in a binder such as an organic solvent to prepare a slurry, with coating then performed by applying this slurry containing the dispersed gold (Au) particles to the substrate. Further, in an inkjet method, an ink having particles of the gold (Au) or the like dispersed therein can be used to perform coating of predetermined areas on the metal substrate surface.

The heat treatment step (S16) is a step of heat treating the metal substrate 24 having the conductive coating 30 of gold (Au) or the like formed thereon. The heat treatment may be conducted to further improve the adhesion between the metal substrate 24 and the conductive coating 30. By conducting the heat treatment of the metal substrate 24 having the conductive coating 30 of gold (Au) or the like formed thereon at a predetermined temperature, the metal of the metal substrate 24 and the gold (Au) or the like undergo mutual interdiffusion, thereby improving the adhesion between the metal substrate 24 and the conductive coating 30. For example, in those cases where the metal substrate 24 is molded from titanium (Ti), the titanium (Ti) and the gold (Au) or the like undergo mutual interdiffusion, thus improving the adhesion between the metal substrate 24 molded from titanium and the conductive coating 30 of gold (Au) or the like.

Figure 6:
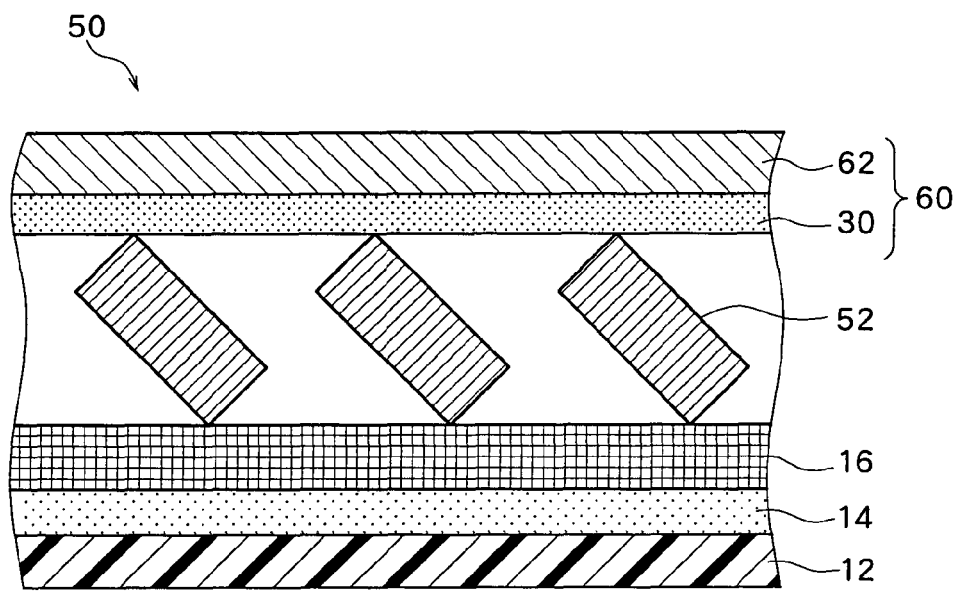
FIG. 6 is a diagram illustrating a cross-section of a unit cell for a fuel cell according to another embodiment of the present invention.

In the above embodiment, the description focused on a unit cell 10 that used uneven fuel cell separators 20, but the fuel cell separators used in the unit cell are not restricted to this type of uneven shape, and other shapes are also possible. FIG. 6 is a diagram illustrating a cross-section of another unit cell 50 for a fuel cell. Those structural elements that are the same as the previous embodiment are labeled using the same numerical symbols, and detailed description of these elements is omitted. The unit cell 50 comprises an electrolyte membrane 12, a catalyst layer 14, a gas diffusion layer 16, a passage-forming member 52 that forms a gas passage or cooling water passage or the like, and a separator 60. The passage-forming member 52 uses a porous metal or expanded metal structure or the like formed from a base material such as titanium or stainless steel.

Figure 7:
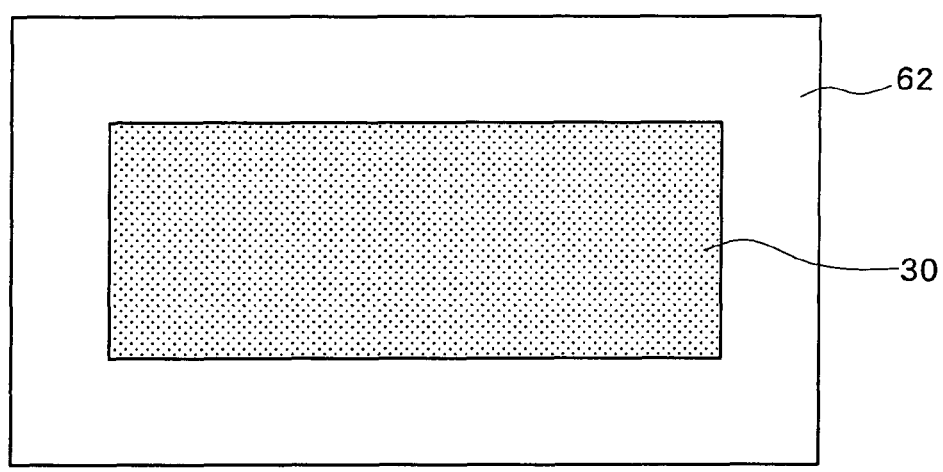
FIG. 7 is a diagram illustrating a surface that opposes a passage-forming member in a fuel cell separator according to another embodiment of the present invention.

FIG. 7 is a diagram illustrating the surface of the fuel cell separator 60 that opposes the passage-forming member 52. A sheet-like metal substrate 62 is used for the separator 60. A conductive coating 30 formed from gold (Au), silver (Ag) or copper (Cu) or the like is provided on the surface of the metal substrate 62 that opposes the passage-forming member 52. This suppresses any increase in the contact resistance between the separator 60 and the passage-forming member 52, thereby inhibiting any decrease in conductivity.

In this embodiment, by ensuring that the average particle size of the conductive particles contained within the conductive coating in the fuel cell separator is not less than 1 nm and not more than 100 nm, the contact surface area with the metal substrate can be increased compared with those cases where a coating containing conductive particles of a larger particle size is used, which results in improved adhesion of the conductive coating. Furthermore, because the metal substrate surface can be coated more densely, the coating rate for the metal substrate surface can be increased. Moreover, the amount used of the gold (Au) or the like can be reduced, which enables the manufacturing cost of the fuel cell separator to be kept to a minimum.

In the above embodiment, ensuring that the average particle size of the conductive particles contained within the conductive coating in the fuel cell separator is not less than 1 nm and not more than 10 nm, and more preferably not less than 1 nm and not more than 5 nm, enables the adhesion of the conductive coating and the coating rate for the metal substrate surface to be improved even further, and enables the manufacturing costs for the fuel cell separator to be further reduced.

In the above embodiment, by forming the conductive coating in the fuel cell separator from gold (Au), the corrosion resistance of the conductive coating can be further enhanced, and the contact resistance can be further reduced.

In the fuel cell separator of the above embodiment, by providing an oxide layer formed from titanium oxide or the like between the metal substrate and the conductive coating, the adhesion of the conductive coating can be further improved.

EXAMPLES

A fuel cell separator was prepared by coating the surface of a metal substrate molded from titanium with a conductive coating comprising gold (Au) particles, and the adhesion and the like of the conductive coating were then evaluated.

First is a description of the method of manufacturing the fuel cell separator used in the evaluations of adhesion and the like. The method of manufacturing the fuel cell separator was conducted in accordance with the manufacturing steps shown in FIG. 5. Pure titanium was used as the metal material for molding the metal substrate. The titanium substrate molded from pure titanium was pretreated by degreasing using an alkali electrolytic degreasing treatment, followed by acid washing.

Next, the pretreated titanium substrate was coated with a conductive coating of gold (Au). The coating method used for forming the gold (Au) coating employed electroplating using a phosphoric acid bath. The particle size of the gold (Au) particles formed on the titanium substrate were controlled by altering the gold content from 0.5 g/l to 10 g/l, altering the current density from 0.01 A/dm$^2$ to 10 A/dm$^2$, and altering the plating treatment time from 1 second to 10 minutes.

The average particle size for the gold (Au) particles was set to 1 nm in the separator of example 1, 5 nm in the separator of example 2, 10 nm in the separator of example 3, 100 nm in the separator of example 4, 500 nm in the separator of comparative example 1, and 1,000 nm in the separator of comparative example 2. Following formation of the gold (Au) coating on the titanium substrate, each separator was subjected to a heat treatment at 260° C. for 90 minutes.

Figure 8:
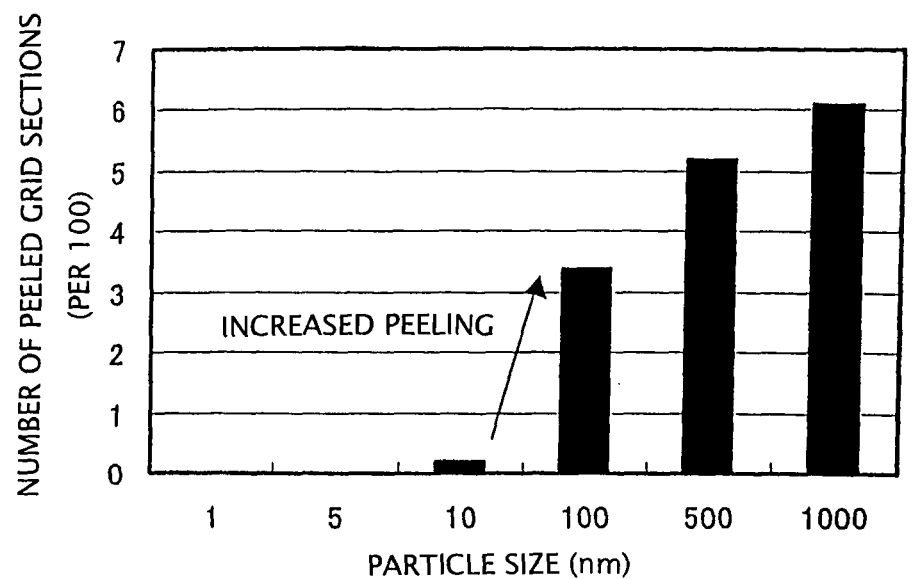
FIG. 8 is a graph illustrating the results of evaluating the adhesion of the gold (Au) coating in an embodiment of the present invention.

Each of the prepared fuel cell separators was evaluated for adhesion of the gold (Au) coating. The adhesion of the gold (Au) coating was evaluated using the cross-cut adhesion test method of JIS K 5400. FIG. 8 is a graph illustrating the results of evaluating the adhesion of the gold (Au) coating. In FIG. 8, the average particle size of the gold (Au) particles that form the gold (Au) coating formed on the surface of each of the separators is shown along the horizontal axis, and the number of peeled grid sections is shown along the vertical axis, with each of the results for the number of peeled grid sections shown as a bar graph. The number of peeled sections describes the number of peeled grid sections per 100 grid sections.

In the separators of examples 1 to 4, which were coated with a gold (Au) coating having an average particle size for the gold (Au) particles of 1 nm to 100 nm, peeling of the gold (Au) coating was minimal, and in the separators of examples 1 to 3, in which a gold (Au) coating having an average particle size for the gold (Au) particles of 1 nm to 10 nm was formed, almost no peeling of the gold (Au) coating was observed. In contrast, in the separators of comparative examples 1 and 2, in which a gold (Au) coating having an average particle size for the gold (Au) particles of 500 nm or 1,000 nm was formed, 5 or more of the 100 grid sections were peeled off in each case. These results confirm that the adhesion of the gold (Au) coating in the separators of examples 1 to 4 was superior to that in the separators of the comparative examples 1 and 2. Furthermore, in the separators of examples 1 to 3, which were coated with a gold (Au) coating having an average particle size for the gold (Au) particles of not less than 1 nm and not more than 10 nm, and particularly in the separators of examples 1 and 2, which were coated with a gold (Au) coating having an average particle size for the gold (Au) particles of not less than 1 nm and not more than 5 nm, the adhesion of the gold (Au) coating was further enhanced.

Figure 9:
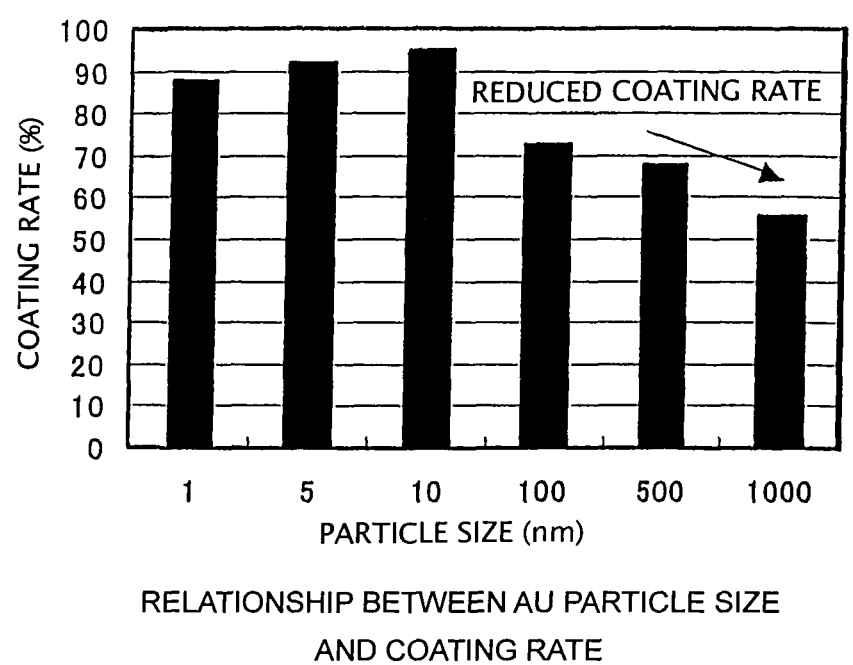
FIG. 9 is a graph illustrating the results of evaluating the coating property of the gold (Au) coating in an embodiment of the present invention.

Next, the coating property of the gold (Au) coating was evaluated. The coating property of the gold (Au) coating was evaluated by using an SEM or metal microscope or the like to inspect each of the separators having a gold (Au) coating formed on a titanium substrate. FIG. 9 is a graph illustrating the results of evaluating the coating property of the various gold (Au) coatings. In FIG. 9, the average particle size of the gold (Au) particles that form the gold (Au) coating formed on the surface of each of the separators is shown along the horizontal axis, and the coating rate is shown along the vertical axis, with the coating rate for each of the separators represented by a bar graph. The coating rate (%) is calculated as the ratio of surface area coated by gold (Au) per unit surface area of the titanium substrate.

In the separators of examples 1 to 4, which were coated with a gold (Au) coating having an average particle size for the gold (Au) particles of 1 nm to 100 nm, the coating rate was 70% or greater. In contrast, in the separators of comparative examples 1 and 2, which were coated with a gold (Au) coating having an average particle size for the gold (Au) particles of 500 nm or 1,000 nm, the coating rate was less than 70%. Furthermore, in the separators of examples 1 to 3, which were coated with a gold (Au) coating having an average particle size for the gold (Au) particles of 1 nm to 10 nm, the coating rate was at least 80%, indicating a further improvement in the coating property of the gold (Au) coating.

Figure 10:
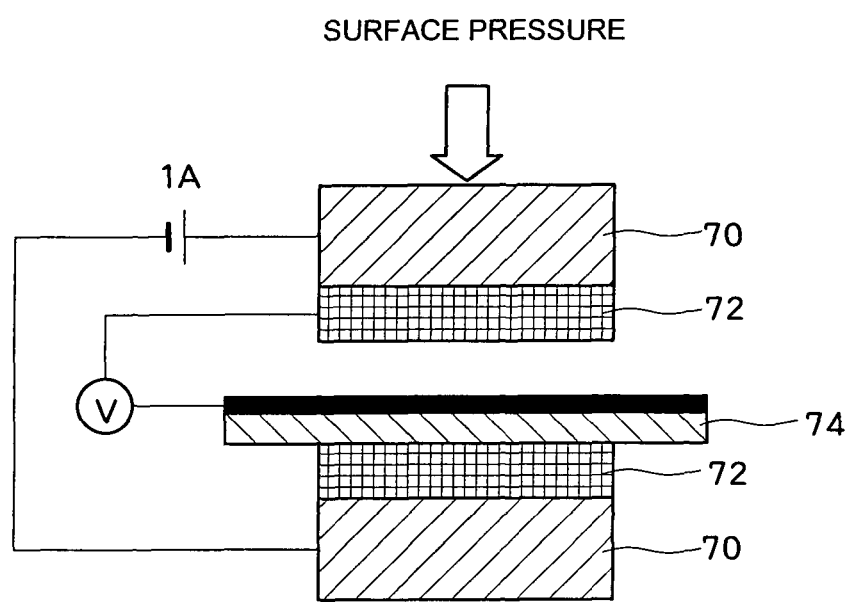
FIG. 10 is a diagram illustrating a method of measuring the contact resistance in a separator according to an embodiment of the present invention.

Next, the contact resistance of the fuel cell separator was evaluated. FIG. 10 is a diagram illustrating the method used for measuring the contact resistance in the separator. Following the fitting of gas diffusion layer materials 72 to a metal jig 70, each separator was sandwiched, as a test piece 74, between the two gas diffusion layer materials 72, and a predetermined surface pressure was then applied to bond the structure together. Subsequently, a current of 1 A was allowed to flow through the structure for a predetermined period of time, the voltage between the conductive coating or the surface bearing the conductive thin coating layer and the surface of the gas diffusion layer material was measured, and the contact resistance between the separator and the gas diffusion layer material 72 was calculated.

Figure 11:
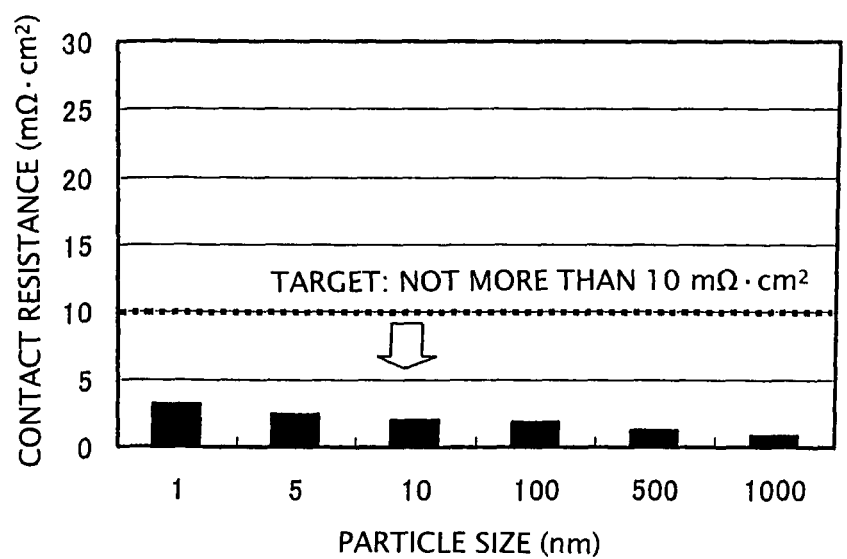
FIG. 11 is a graph illustrating the results of measuring the contact resistance in a separator according to an embodiment of the present invention.

FIG. 11 is a graph illustrating the results of measuring the contact resistance in each of the separators. In FIG. 11, the average particle size of the gold (Au) particles that form the gold (Au) coating formed on the surface of each of the separators is shown along the horizontal axis, and the contact resistance ($m\Omega \cdot cm^2$) is shown along the vertical axis, with the contact resistance value for each of the separators represented by a bar graph. As is evident from FIG. 11, the separators of examples 1 to 4, which were coated with a gold (Au) coating having an average particle size for the gold (Au) particles of 1 nm to 100 nm, and the separators of comparative examples 1 and 2 which were coated with a gold (Au) coating having an average particle size for the gold (Au) particles of 500 nm or 1,000 nm, all exhibited a contact resistance value less than the target value of 10 ($m\Omega \cdot cm^2$). These results indicate that all of the fuel cell separators exhibited excellent conductivity.

Figure 12:
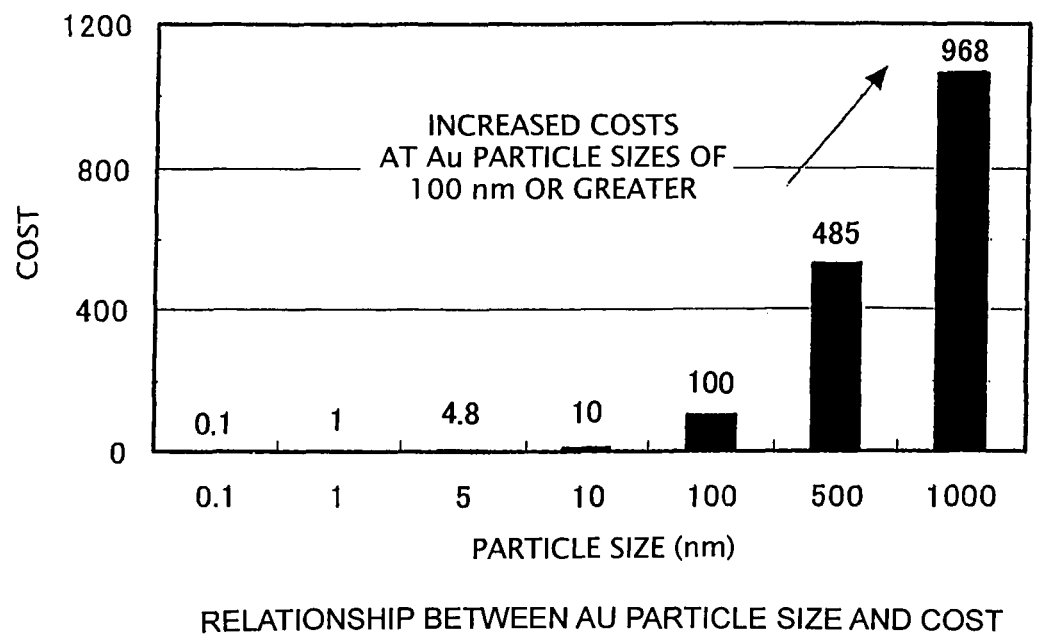
FIG. 12 is a graph illustrating the results of evaluating the cost of the gold (Au) coating in an embodiment of the present invention.

Next, the cost of the gold (Au) coating was evaluated. The cost of the gold (Au) coating was calculated by determining the amount of gold used in forming a uniform layer on the surface of a titanium substrate, for gold (Au) particles having an average particle size from 1 nm to 1,000 nm. FIG. 12 is a graph illustrating the results of evaluating the cost of the gold (Au) coating. In FIG. 12, the average particle size of the gold (Au) particles is shown along the horizontal axis, and the cost of the gold (Au) coating is shown along the vertical axis, with the costs of the gold used for gold (Au) particles having an average particle size from 1 nm to 1,000 nm shown as a bar graph. The cost of each of the gold (Au) coatings is shown as a relative value of the cost at that particular average particle size relative to a cost of 1 for an average particle size of 1 nm for the gold (Au) particles.

As is evident from FIG. 12, those cases in which the average particle size of the gold (Au) particles was from 1 nm to 100 nm exhibited considerably lower costs than the cases where the average particle size of the gold (Au) particles was 500 nm or 1,000 nm. Furthermore, by restricting the average particle size of the gold (Au) particles to a value of not less than 1 nm and not more than 10 nm, and particularly to a value of not less than 1 nm and not more than 5 nm, even lower costs were achieved. From these results it is clear that the separators of examples 1 to 4 can be manufactured at lower cost than the separators of comparative examples 1 and 2.

REFERENCE SIGNS LIST 10, 50 Unit cell
12 Electrolyte membrane
14 Catalyst layer
16 Gas diffusion layer
20, 40, 60 Separator
22 Membrane electrode assembly
24, 62 Metal substrate
30 Conductive coating
42 Oxide layer
52 Passage-forming member
70 Metal jig
72 Gas diffusion layer material
74 Test piece

The invention claimed is:

1. A fuel cell separator, comprising:
   a metal substrate molded from titanium,
   a conductive coating that exhibits conductivity and is formed on a surface of the metal substrate, and
   an oxide layer being a continuous layer provided between the metal substrate and the conductive coating,
   wherein
   the conductive coating comprises gold particles,
   an average particle size of the gold particles is not less than 1 nm and not more than 100 nm, and
   the thickness of the oxide layer is from 5 nm to 200 nm.

2. The fuel cell separator according to claim 1, wherein the average particle size of the gold particles is not less than 1 nm and not more than 10 nm.

3. The fuel cell separator according to claim 2, wherein the average particle size of the gold particles is preferably not less than 1 nm and not more than 5 nm.

4. The fuel cell separator according to claim 1, wherein the oxide layer is a titanium oxide layer.

5. A fuel cell, comprising a fuel cell separator according to claim 1.

6. The fuel cell according to claim 5, wherein the average particle size of the gold particles is not less than 1 nm and not more than 10 nm.

7. The fuel cell according to claim 6, wherein the average particle size of the gold particles is preferably not less than 1 nm and not more than 5 nm.

8. The fuel cell according to claim 5, wherein the oxide layer is a titanium oxide layer.

9. The fuel cell separator according to claim 1, wherein a coating rate of the surface of the metal substrate by the conductive coating is 70% or greater.

* * * * *